US012661844B2

(12) United States Patent
Creemers

(10) Patent No.: US 12,661,844 B2
(45) Date of Patent: Jun. 23, 2026

(54) METHOD OF THERMOFORMING A THERMOFORMABLE POLYMERIC SHEET MATERIAL OVER AN INSERT

(71) Applicant: Auria Solutions UK I, Ltd., London (GB)

(72) Inventor: Luc Creemers, Hasselt (BE)

(73) Assignee: Auria Solutions UK I, Ltd., London (GB)

( * ) Notice: Subject to any disclaimer, the term of this patent is extended or adjusted under 35 U.S.C. 154(b) by 52 days.

(21) Appl. No.: 18/691,501

(22) PCT Filed: Oct. 20, 2022

(86) PCT No.: PCT/EP2022/079275
§ 371 (c)(1),
(2) Date: Mar. 13, 2024

(87) PCT Pub. No.: WO2023/067096
PCT Pub. Date: Apr. 27, 2023

(65) Prior Publication Data
US 2024/0399646 A1     Dec. 5, 2024

Related U.S. Application Data

(60) Provisional application No. 63/262,774, filed on Oct. 20, 2021.

(51) Int. Cl.
B29C 51/12          (2006.01)
B29C 51/10          (2006.01)
(Continued)

(52) U.S. Cl.
CPC .............. B29C 51/12 (2013.01); B29C 51/10 (2013.01); B29K 2023/06 (2013.01);
(Continued)

(58) Field of Classification Search
CPC ................................. B29C 51/12; B29C 51/10
See application file for complete search history.

(56) References Cited

U.S. PATENT DOCUMENTS 3,770,546 A * 11/1973 Childress ................ B29C 63/44
                                                            156/286
4,741,284 A * 5/1988 Madison ................. B29C 51/12
                                                            D12/302
(Continued)

FOREIGN PATENT DOCUMENTS

CA          2661497 A1     2/2008
CN          103286937 A     9/2013
(Continued)

OTHER PUBLICATIONS

International Search Report and Written Opinion from corresponding PCT Appln. No. PCT/EP2022/079275, dated Feb. 13, 2023. 14 pages.

*Primary Examiner* — Edmund H Lee
(74) *Attorney, Agent, or Firm* — Secant IP, PLLC; Steven J. Grossman

(57)          ABSTRACT
An insert for use in vacuum forming that is locked in place with the vacuum forming material. More specifically, the insert includes one or more undercuts wherein the sheet that is vacuum formed around the undercut is locked without the need for additional manufacturing components and/or procedures. The process is particularly suitable for automotive applications.

15 Claims, 6 Drawing Sheets

(51) Int. Cl.
   *B29K 23/00*       (2006.01)
   *B29K 705/00*     (2006.01)
   *B29L 31/30*      (2006.01)

(52) U.S. Cl.
   CPC .. *B29K 2023/0625* (2013.01); *B29K 2023/12*
        (2013.01); *B29K 2023/16* (2013.01); *B29K*
           *2705/00* (2013.01); *B29L 2031/3017*
          (2013.01); *B29L 2031/3041* (2013.01)

(56)            References Cited

U.S. PATENT DOCUMENTS 5,839,847 A  *  11/1998  Patel ....................... B29C 70/72
                                          403/269
2019/0152125 A1*  5/2019  Torlay ....................... B32B 3/06

FOREIGN PATENT DOCUMENTS

| | | | |
|---|---|---|---|
| DE | 1246215 | B | 8/1967 |
| DE | 2110617 | A1 | 9/1971 |
| EP | 3868543 | * | 8/2021 |
| FR | 1113401 | A | 3/1956 |
| GB | 822609 | A | 10/1959 |
| JP | 2001150532 | A1 | 6/2001 |
| WO | 2008024450 | A1 | 2/2008 |
| WO | WO2018/225413 | * | 12/2018 |

* cited by examiner

FORCE

METHOD OF THERMOFORMING A THERMOFORMABLE POLYMERIC SHEET MATERIAL OVER AN INSERT

FIELD

The present invention is directed at an insert for use in vacuum forming that is locked in place with the vacuum forming sheet material. More specifically, the insert includes one or more undercuts such that the insert becomes locked to the sheet that is vacuum formed around the insert without the need for additional manufacturing components and/or procedures. The process is particularly suitable for automotive applications.

BACKGROUND

There are a number of parts made in the plastic industry by a thermoforming procedure. The basic approach of such a procedure is to heat a plastic sheet until it softens and then force the heated and now formable sheet against the contours of a mold by the use of mechanical force, air and/or vacuum pressure. Upon cooling the plastic sheet then assumes the shape of the mold.

In the automotive industry, there is an on-going need to secure various parts to certain portions of the vehicle, such as a vehicle floor or vehicle trim panel. As may be appreciated, there is also an on-going need to achieve such attachment while minimizing or eliminating as many manufacturing protocols that may otherwise be required. Accordingly, the present invention seeks to address such problems by providing an insert that can be utilized in a vacuum forming procedure that can be locked in place which can therefore include, e.g., an insert attached and locked to a vehicular floor panel that then serves as a footrest or an insert that includes a mechanical attachment feature to allow for mechanical attachment of another vehicle trim component.

SUMMARY

A method of thermoforming a thermoformable polymeric sheet material over an insert comprising: (a) supplying an insert having at least two vertically disposed walls and at least two horizontally disposed walls extending from an upper portion of each of the vertically disposed walls, and a horizontal connecting wall extending between a lower portion of the vertically disposed walls, wherein the horizontally disposed walls extending form the upper portion of the vertically disposed walls intersect with each of the vertically disposed walls at an angle of 60° to 120°, thereby providing two undercut locations; and (b) positioning the insert into a vacuum forming mold and supplying a thermoformable polymeric resin sheet material that is positioned over the insert and heating the thermoformable polymeric resin material along with the application of vacuum wherein the thermoformable polymeric resin engages with the insert and substantially conforms to the two undercut locations thereby locking the insert into the thermoformable polymer resin.

DETAILED DESCRIPTION

Figure 1:
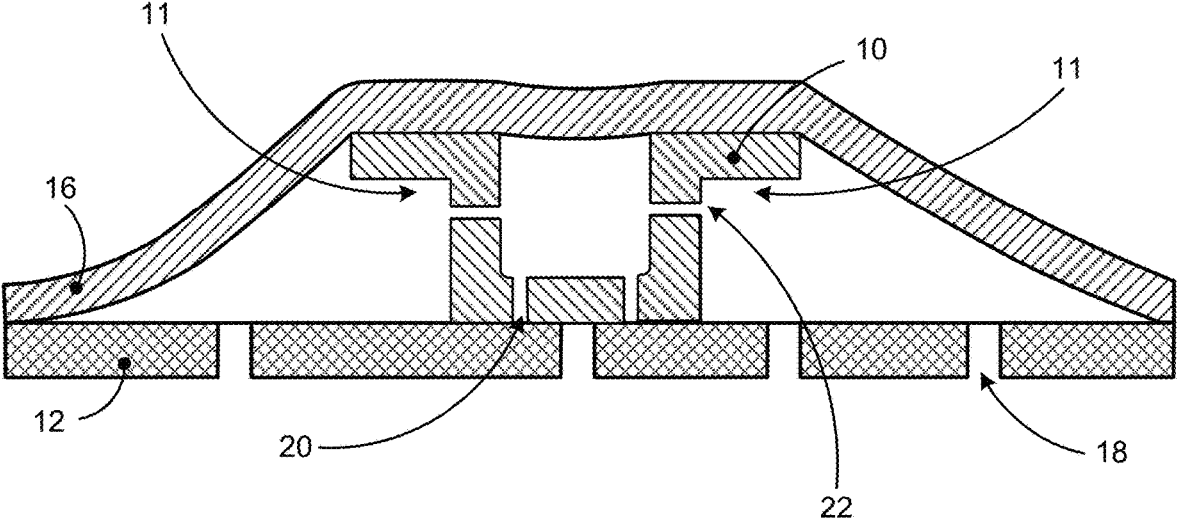
FIG. 1 illustrates in cross-section the first part of the sequence of vacuum thermoforming of an insert to the thermoformable polymeric resin sheet.

Reference is made to FIG. 1 which illustrates in cross-section a preferred insert configuration 10 placed upon the surface of vacuum tooling 12 in order to lock the insert with a heated and formable polymeric sheet material 16. The preferred insert as illustrated is generally "U" shaped, but the present invention contemplates other geometrical forms that may then provide one or more undercut locations 11.

As can be seen, the tooling preferably includes a plurality of ports 18 where vacuum may be drawn thereby creating a negative pressure across the entire surface of the tooling 12. In addition, the insert itself preferably includes one or more ports 20 which are positioned on that portion of the insert where a vacuum may not be achieved, due to the insert geometry that prevents the vacuum from the tooling from reaching the polymeric sheet material. As can therefore be observed, one or more ports may be preferably placed on the bottom horizontal wall portion of the "U" shaped insert configuration, to ensure drawing of the polymeric sheet into the interior of the "U" shaped form. In addition, optionally, one may utilize plug-assist at such location, to force the polymeric sheet down and into the interior of the insert. In addition, optionally, one may include additional ports 22 at those locations in the insert 10 to further assist the drawing of the formable polymeric sheet material 16 into the undercut locations.

As can now be appreciated, FIG. 1 represents the first part of the sequence wherein the heated and formable polymeric sheet material can be seen as partially draped over insert 10. Reference to a formable polymeric sheet material herein is reference to any thermoplastic sheet material that can be heated and then assumes a formable state such that it can be formed over the insert 10. Such formable state may be conveniently identified by reference to the glass transition temperature of the resin (Tg) and/or the heat distortion temperature (HDT) at 66 psi. Preferably, such formable polymeric sheet material has a thickness in the range of 1.0 mm to 10.0 mm, more preferably 1.0 mm to 8.0 mm. The sheet is preferably heated to a temperature in the range of 150° C. to 225° C., more preferably a temperature range of 160° C. to 210° C. so that it assumes a state where it can be formed around a portion of the insert, as discussed more fully herein.

Preferred polymeric resins for the polymeric sheet material may therefore include polyolefins, such as polyethylene or polypropylene, including copolymers thereof, that may optionally be filled with mineral fillers. One exemplary copolymer would include polyethylene-co-vinylacetate (EVA). The preferred polyethylene resin may include linear low density polyethylene (LLDPE) and metallocene based polyethylene resins (i.e. those polyethylene polymers or copolymers that are made utilizing metallocene type catalysis). LLDPE typically indicates a density in the range of 0.91 g/cm³ to 0.94 g/cm³ and has a controlled amount of short chain branching. Preferred mineral fillers in any of the previously identified polymeric resins include calcium sulfate, barium sulfate, and/or talc.

The insert 10 may itself be formed from polymeric material which itself does not deform at temperatures that the polymeric sheet material becomes formable. For example, the insert may therefore be one that is selected from a polymer resin that has a relatively higher glass transition temperature (Tg), melting temperature (Tm) and/or heat distortion temperature (HDT) at 66 psi, than the polymer resin that is employed for the polymeric sheet material 16. In addition, the insert itself may therefore be made of other materials, such as metals, or ceramics. Additionally, the insert may be formed by the separate procedure of injection molding.

Figure 2:
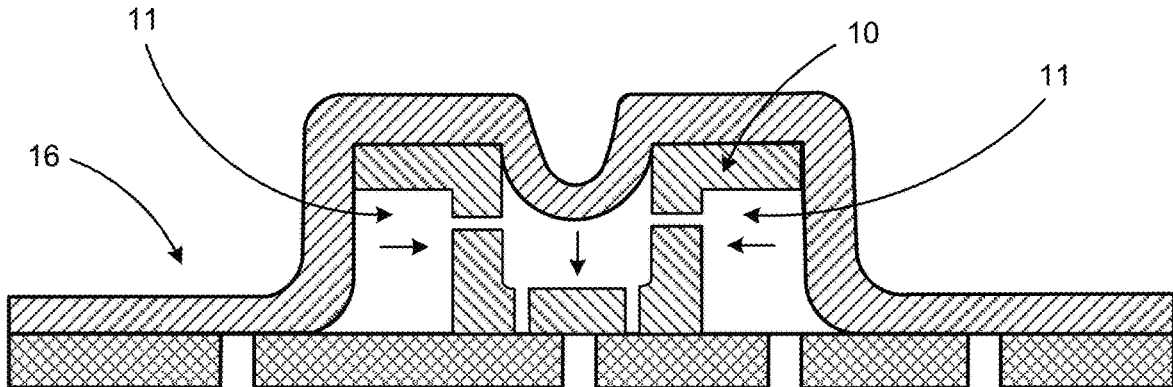
FIG. 2 illustrates in cross-section a second part of the sequence of vacuum thermoforming of an insert to the thermoformable polymeric resin sheet.
Figure 3:
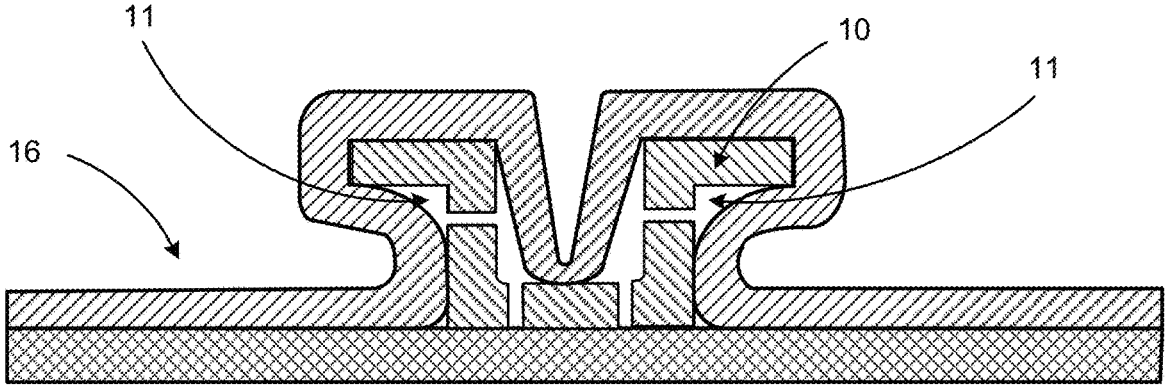
FIG. 3 illustrates in cross-section a third part of the sequence of vacuum thermoforming of the insert to the thermoformable polymeric resin sheet.
Figure 4:
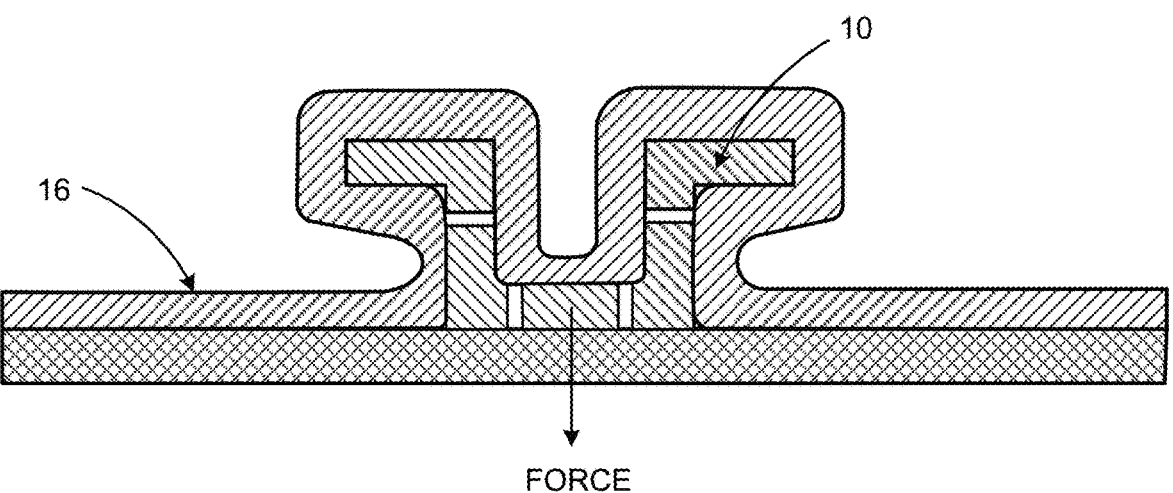
FIG. 4 illustrates in cross-section the fourth and final part of the sequence of thermoforming of the insert to the thermoformable polymeric resin sheet.

FIG. 2 next represents the sequence where, as can be observed by the superimposed arrows, the polymeric sheet material is being drawn in the identified directions. In particularly, the sheet material is drawn into the undercut locations 11 and into the interior of the "U" shaped insert. FIG. 3 and FIG. 4 represents the next two steps in the sequence. As observed in FIG. 3, the polymeric sheet material is being drawn into the undercut locations and in the final step shown in FIG. 4, the polymeric sheet material substantially conforms to the undercut locations 11 of insert 10.

As illustrated in FIG. 4, when the embedded insert and surrounding polymeric sheet material is removed from the vacuum tooling, the insert is effectively locked (mechanically engaged) to the polymeric sheet such that it will resist a pull-out force as shown by the arrow in FIG. 4. It can therefore be appreciated that locking of the insert to the polymeric sheet material is achieved without the need for any additional manufacturing steps and/or components, such as the use of fasteners, clips, or adhesives to secure the insert to the polymeric sheet 10.

Figure 5:
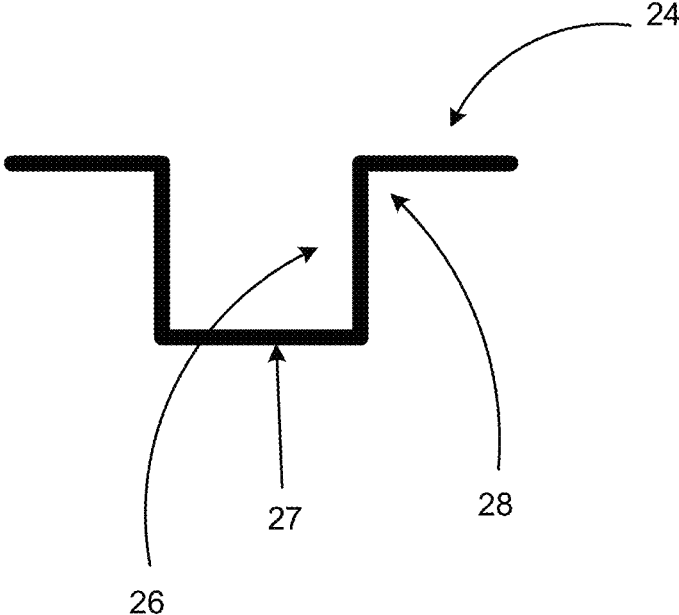
FIG. 5 illustrates in cross-section a preferred insert configuration.

With regards to the preferred characteristic of the insert herein, reference is made to FIG. 5. As illustrated therein, the insert preferably includes one or more upper and generally horizontally disposed walls 24 that intersect with an upper portion of a generally vertically disposed wall 26 to define an angle 28. The generally vertically disposed walls are also joined by a relatively lower horizontal connecting wall 27. The upper horizontally disposed wall 24 may preferably have a length in the range of 1.0 mm to 25.0 mm that projects from the vertically disposed wall, more preferably 2.0 mm to 20.0 mm. The generally vertical walls 26 may have a length in the range of 2.0 mm to 5.0 cm, more preferably 3.0 mm to 15.0 mm, and even more preferably, 3.0 mm to 5.0 mm. The lower horizontally disposed wall 27 may have a length in the range of 8.0 mm to 100.0 cm. The angle formed at 28 which therefore provides the undercut region may preferably be in the range of 60° to 120°, more preferably in the range of 80° to 110°, or even more preferably, in the range of 85° to 95°.

In addition, preferably, the surface of the insert that engages and ultimately comes into contact with the thermoformable polymeric resin is one that includes a coarse or grained type surface. Such coarse or grained type surface is preferably present at the undercut locations. The use of such a coarse or grained surface may then reduce or eliminate the need to provide a vacuum port at that location of the insert to otherwise assist in more specifically drawing the polymeric sheet to the insert surface.

Figure 6:
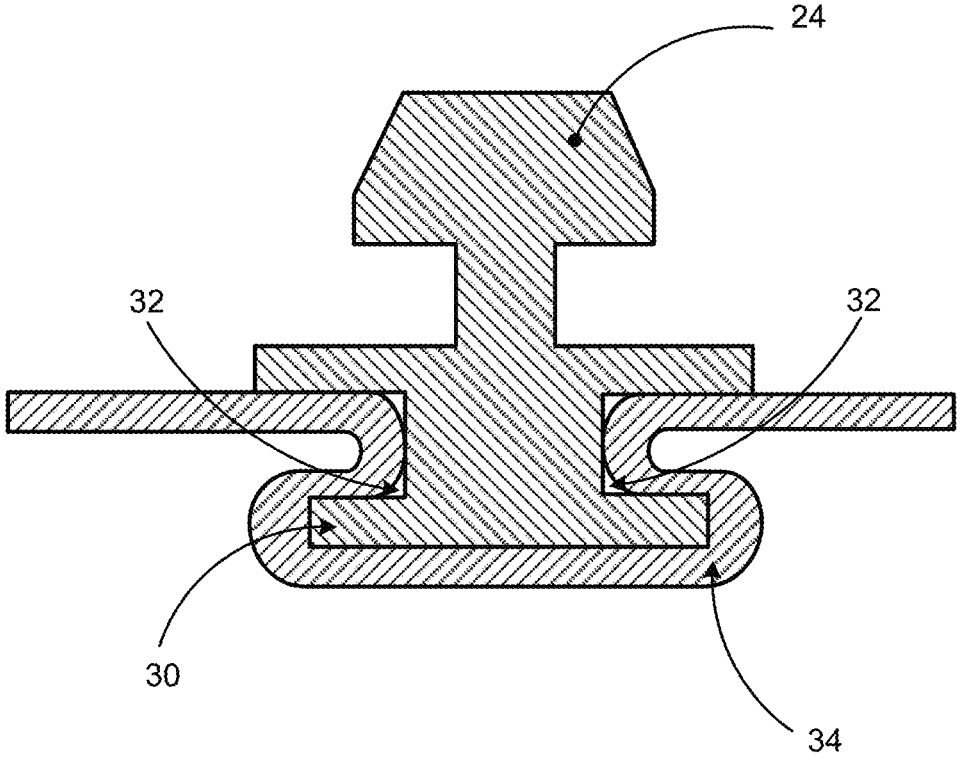
FIG. 6 illustrates an inset with undercuts that is vacuum formed to the thermoformable polymeric sheet which insert includes a mechanical attachment feature.

FIG. 6 illustrates another embodiment of the present invention, wherein an insert 30 with undercuts 32 is vacuum formed to polymeric sheet material 34 according to the procedures herein such that the insert 30 is again locked to the polymer sheet material. The insert 30 now optionally includes a mechanical attachment feature 36, preferably in a male attachment configuration. This attachment feature therefore allows one to attach a corresponding component to the secured/locked insert 30. By way of example, such a configuration illustrated in FIG. 6 would allow for the formation of integrated foot mat clips to conveniently lock vehicle accessory mats in place within a vehicle.

Figure 7:
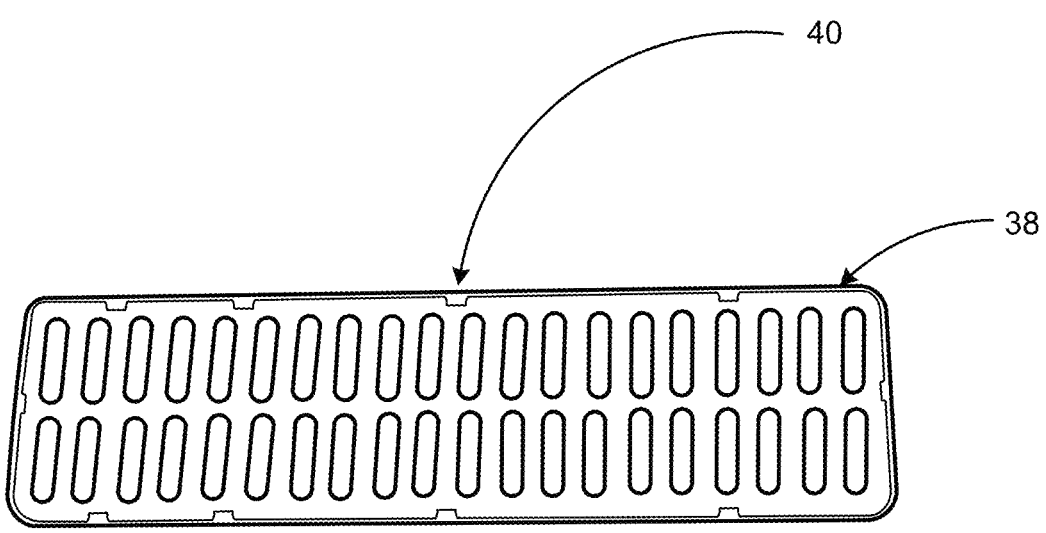
FIG. 7 illustrates an example of a metallic insert suitable for engaging with the thermoformable polymeric sheet material to provide a footrest location in a vehicle.
Figure 8:
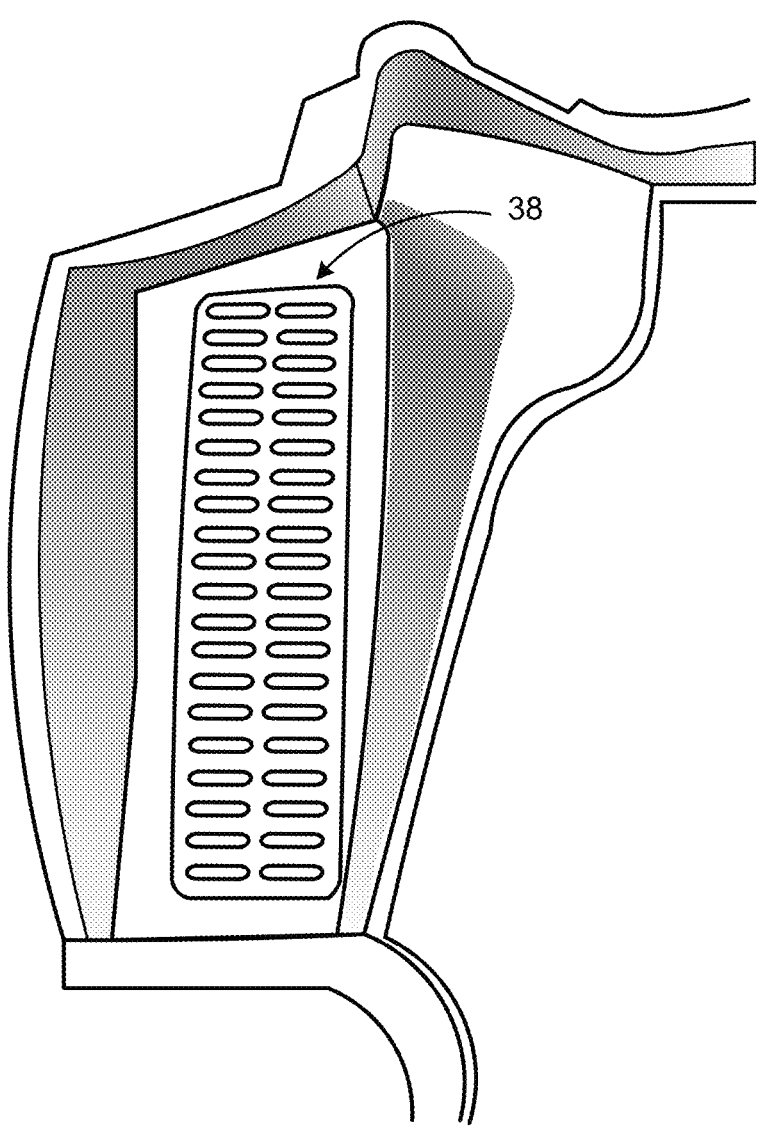
FIG. 8 illustrates a vehicle floor panel prepared herein which includes the footrest insert of FIG. 7.

One working example of the result of the present invention is now illustrated in FIGS. 7-8. As shown in FIG. 7, a metallic insert 38 having a plurality of clips 40 about its perimeter is inserted into the vacuum forming tool. A polymeric sheet material is then drawn over the metallic insert where the clips now define a plurality of undercut locations that as noted, lead to the metallic insert becoming locked to the polymeric sheet material during vacuum forming. As can be seen, there are up to ten (10) clips that therefore would provide ten (10) undercut locations. As the vacuum forming tooling may also include geometrical features that allow for formation of a vehicle floor panel, a partial view of such floor panel is provided in FIG. 8. As can be seen, the metallic insert is locked to the floor panel, and in this case, provides a footrest area for vehicle occupants without the need for any further processing or components (fasteners or adhesives). The result is a flush-mounted metallic footrest.

What is claimed is:

1. A method of thermoforming a thermoformable polymeric sheet material over an insert comprising:

(a) supplying an insert having at least two vertically disposed walls and at least two horizontally disposed walls extending from an upper portion of each of said vertically disposed walls, and a horizontal connecting wall extending between a lower portion of said vertically disposed walls, wherein the horizontally disposed walls extending from said upper portion of said vertically disposed walls intersect with each of said vertically disposed walls at an angle of 60° to 120°, thereby providing two undercut locations, wherein said insert includes one or a plurality of vertical ports extending through the horizontal connecting wall and one or a plurality of horizontal ports extending through the vertically disposed walls, said vertical and horizontal ports being configured to assist in vacuum drawing of the thermoformable polymeric resin sheet material;

(b) positioning said insert into a vacuum forming mold and supplying a thermoformable polymeric resin sheet material that is positioned over said insert and heating said thermoformable polymeric resin material along with the application of vacuum wherein said thermoformable polymeric resin engages with said insert and substantially conforms to the two undercut locations thereby locking said insert into said thermoformable polymer resin.

2. The method of claim 1 wherein said two vertically disposed walls have a length in the range of 2.0 mm to 5.0 cm.

3. The method of claim 1 wherein said two horizontally disposed walls extending from an upper portion of each of said vertically disposed walls have a length in the range of 1.0 mm to 25.0 mm.

4. The method of claim 1 wherein said horizontal connecting wall has a length in the range of 8.0 mm to 100.0 cm.

5. The method of claim 1 wherein said horizontally disposed walls intersect with each of said vertically disposed walls at an angle of 80° to 110°.

6. The method of claim 1 wherein said horizontally disposed walls intersect with each of said vertically disposed walls at an angle of 85° to 95°.

7. The method of claim 1 wherein thermoformable polymeric resin sheet has a thickness in the range of 1.0 mm to 10.0 mm.

8. The method of claim 1 wherein said thermoformable polymeric resin sheet comprises a polyolefin resin.

9. The method of claim 1 wherein said thermoformable polymeric resin comprises polyethylene, polypropylene, and copolymers thereof.

10. The method of claim 1 wherein said thermoformable polymeric resin comprises linear low density polyethylene or metallocene-polyethylene.

11. The method of claim 1 wherein said insert comprises polymeric material or metallic material.

12. The method of claim 1 wherein said thermoformable polymeric resin sheet material has a higher glass transition temperature (Tg), melting temperature (Tm), or heat distortion temperature at 66 psi, than said insert material.

13. The method of claim 1 wherein said insert has a "U" shaped configuration.

14. The method of claim 1 wherein said insert includes a mechanical attachment feature.

15. The method of claim 1 wherein said insert comprises a metallic insert and said thermoformable polymeric material locked to said metallic insert comprises a floor panel or a trim panel for a vehicle.

* * * * *